Aug. 24, 1937.  H. A. S. HOWARTH  2,090,729
RADIAL BEARING
Filed Aug. 19, 1935    9 Sheets-Sheet 3
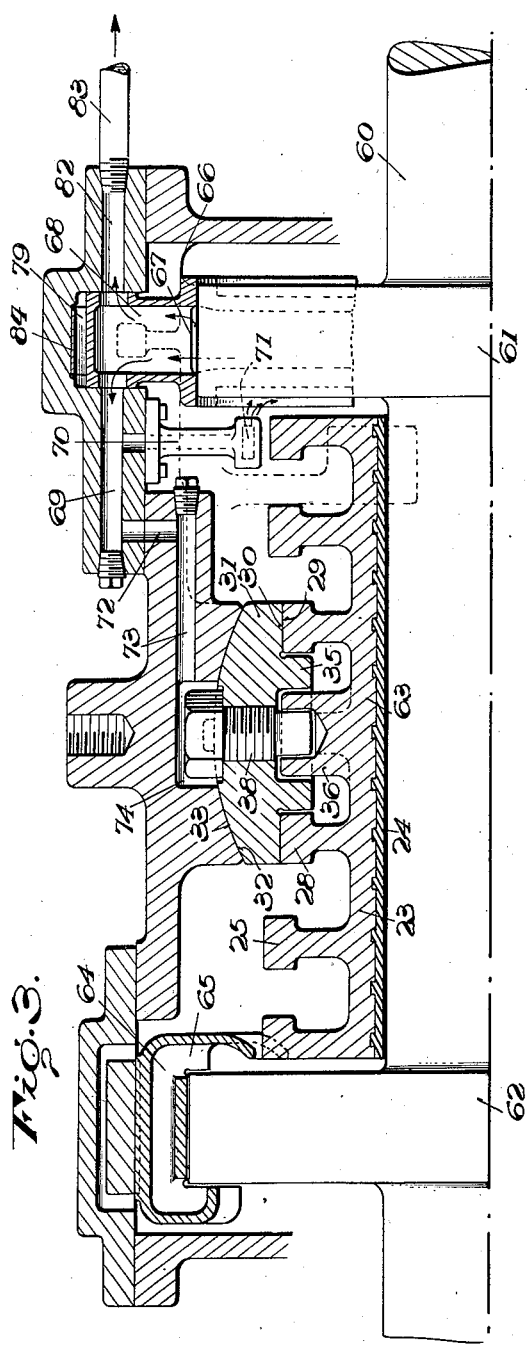
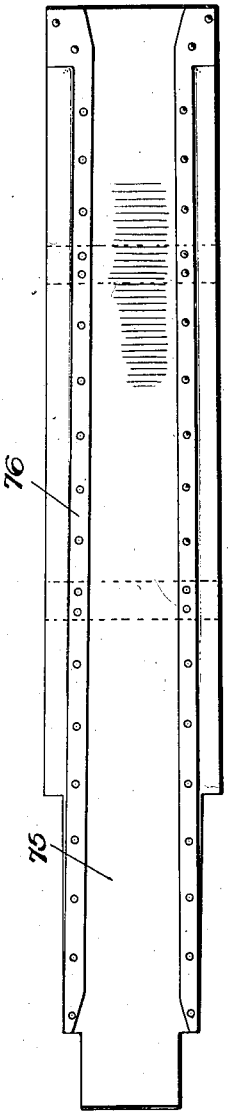
Inventor
Harry A. S. Howarth
By Cameron, Kerkam + Sutton
Attorneys Aug. 24, 1937.　　　H. A. S. HOWARTH　　　2,090,729
RADIAL BEARING
Filed Aug. 19, 1935　　　9 Sheets-Sheet 4
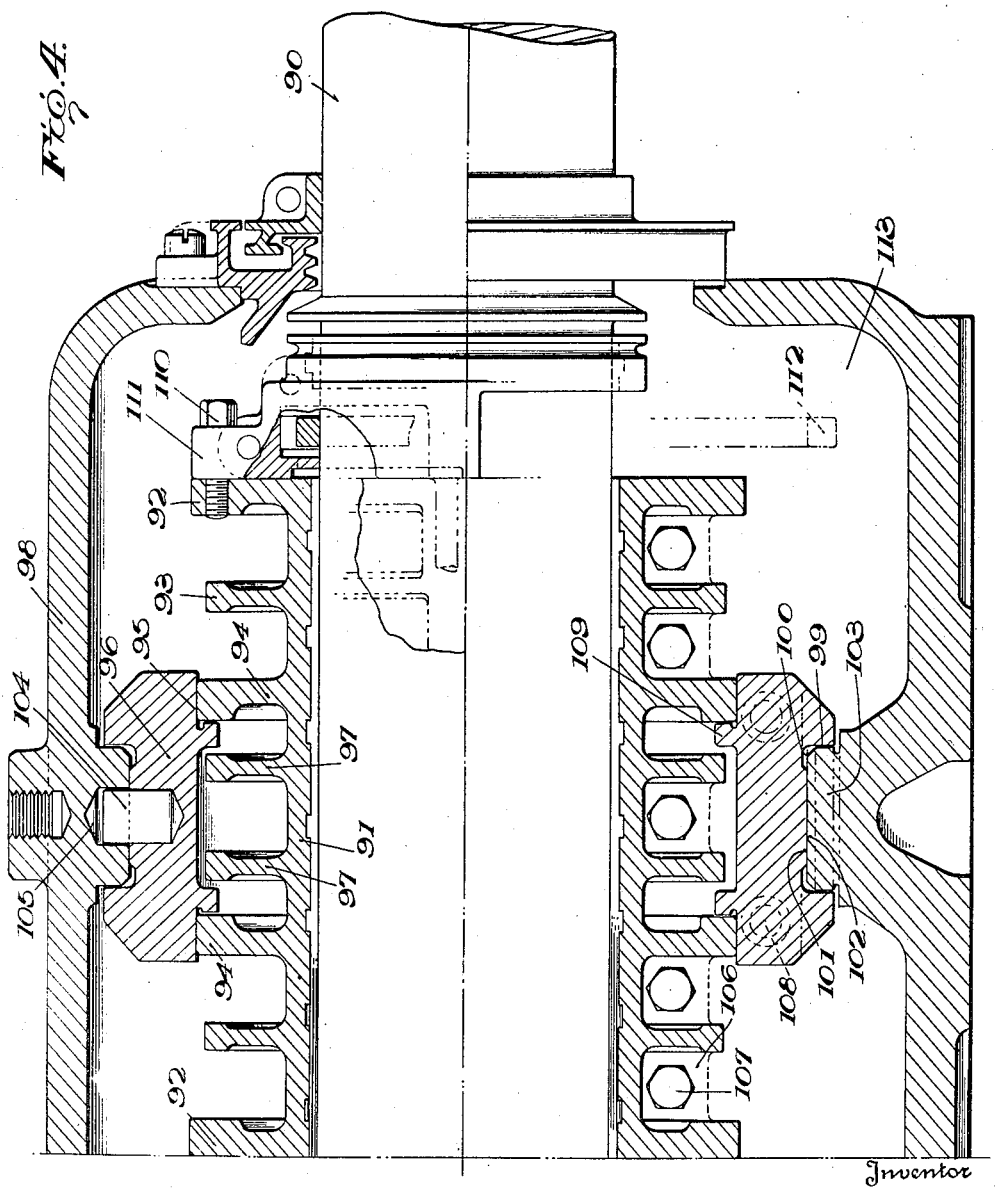
Inventor
Harry A. S. Howarth
By Cameron, Kerkam + Sutton.
Attorneys Aug. 24, 1937.                H. A. S. HOWARTH                2,090,729
                               RADIAL BEARING
                          Filed Aug. 19, 1935          9 Sheets-Sheet 6
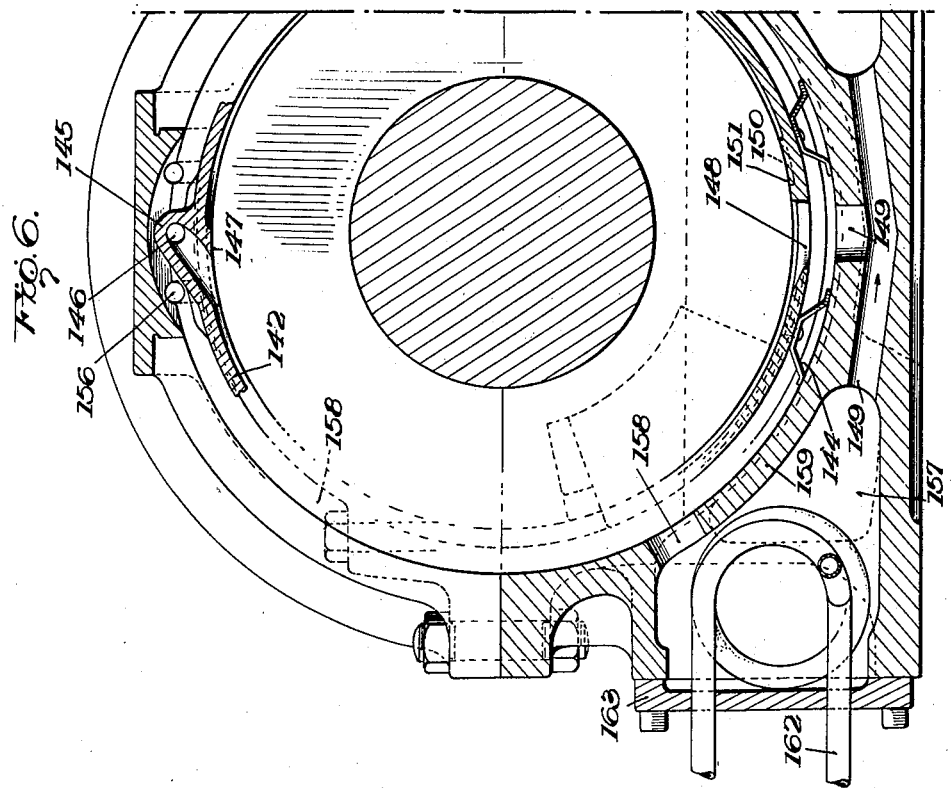
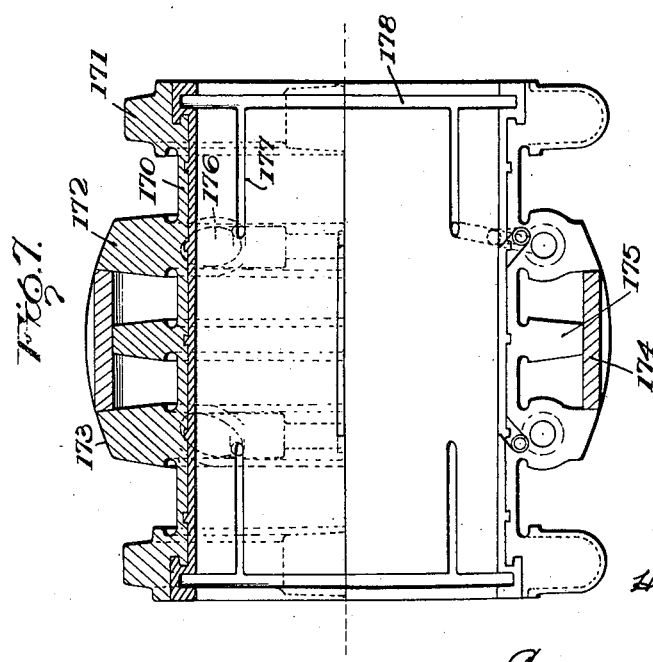
Inventor
Harry A. S. Howarth
By Cameron, Kerkam & Sutton
Attorney Aug. 24, 1937.  H. A. S. HOWARTH  2,090,729
RADIAL BEARING
Filed Aug. 19, 1935   9 Sheets-Sheet 7
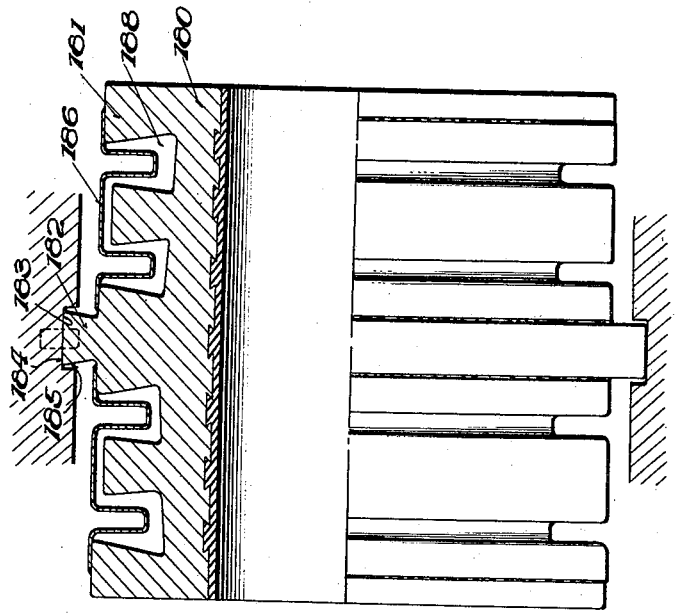
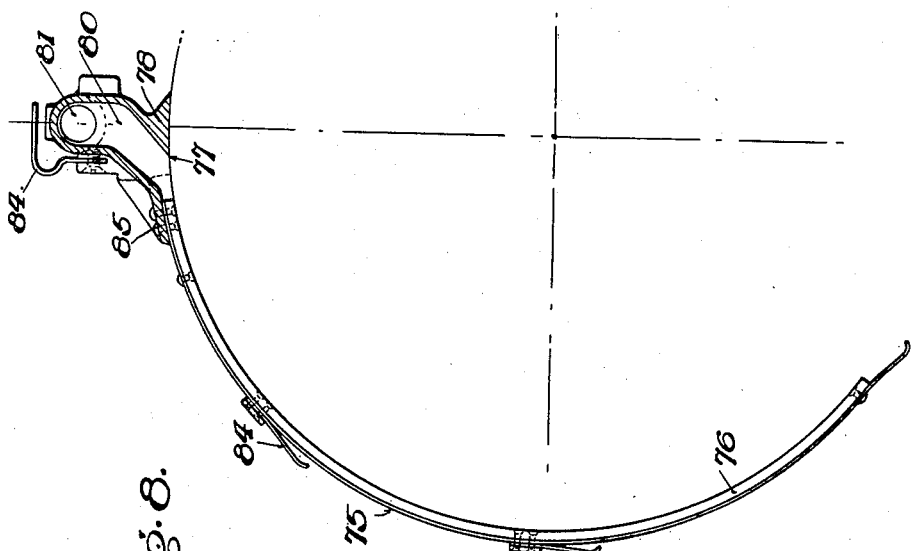
Inventor
Harry A. S. Howarth
By Cameron, Kerkam + Sutton
Attorneys

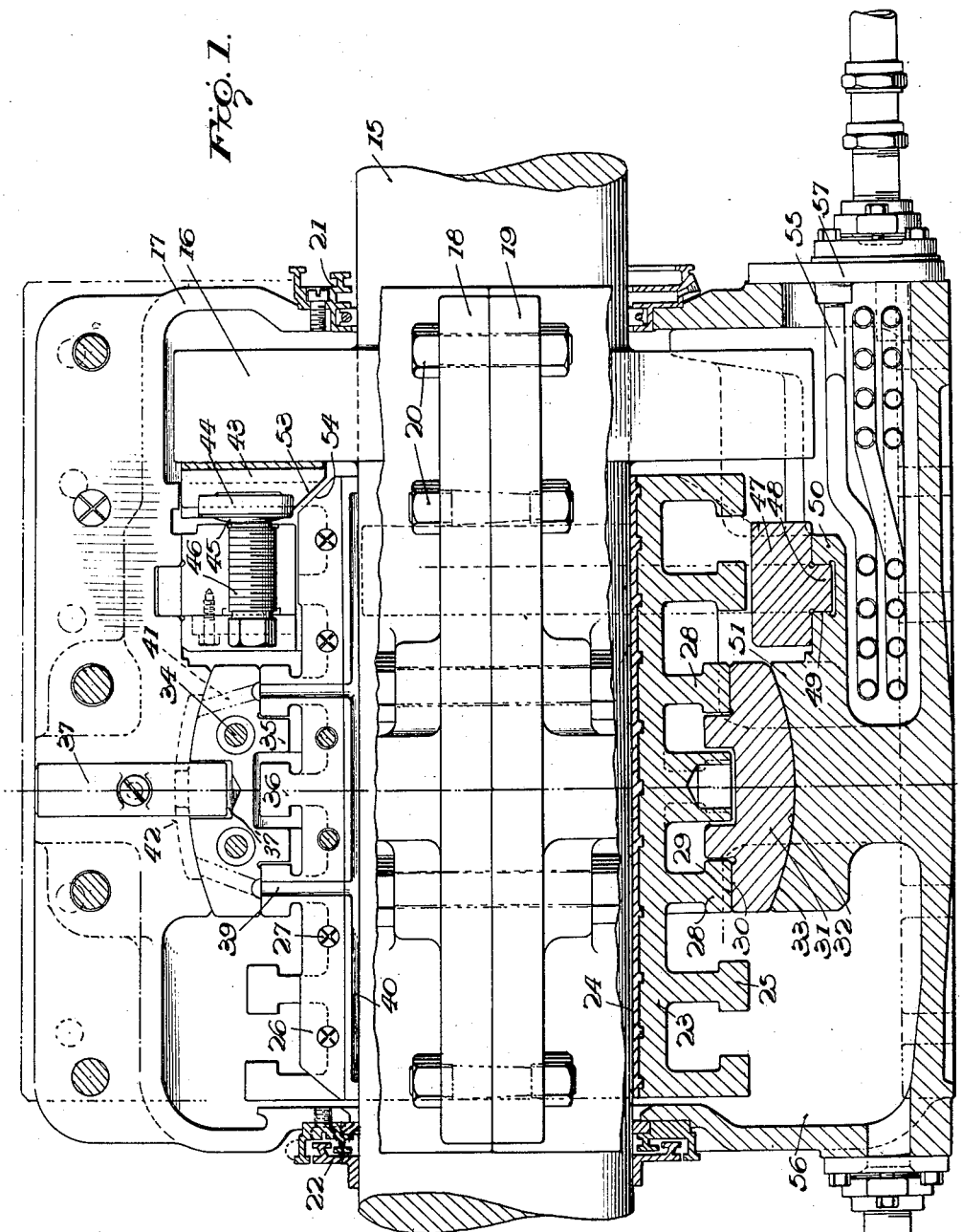

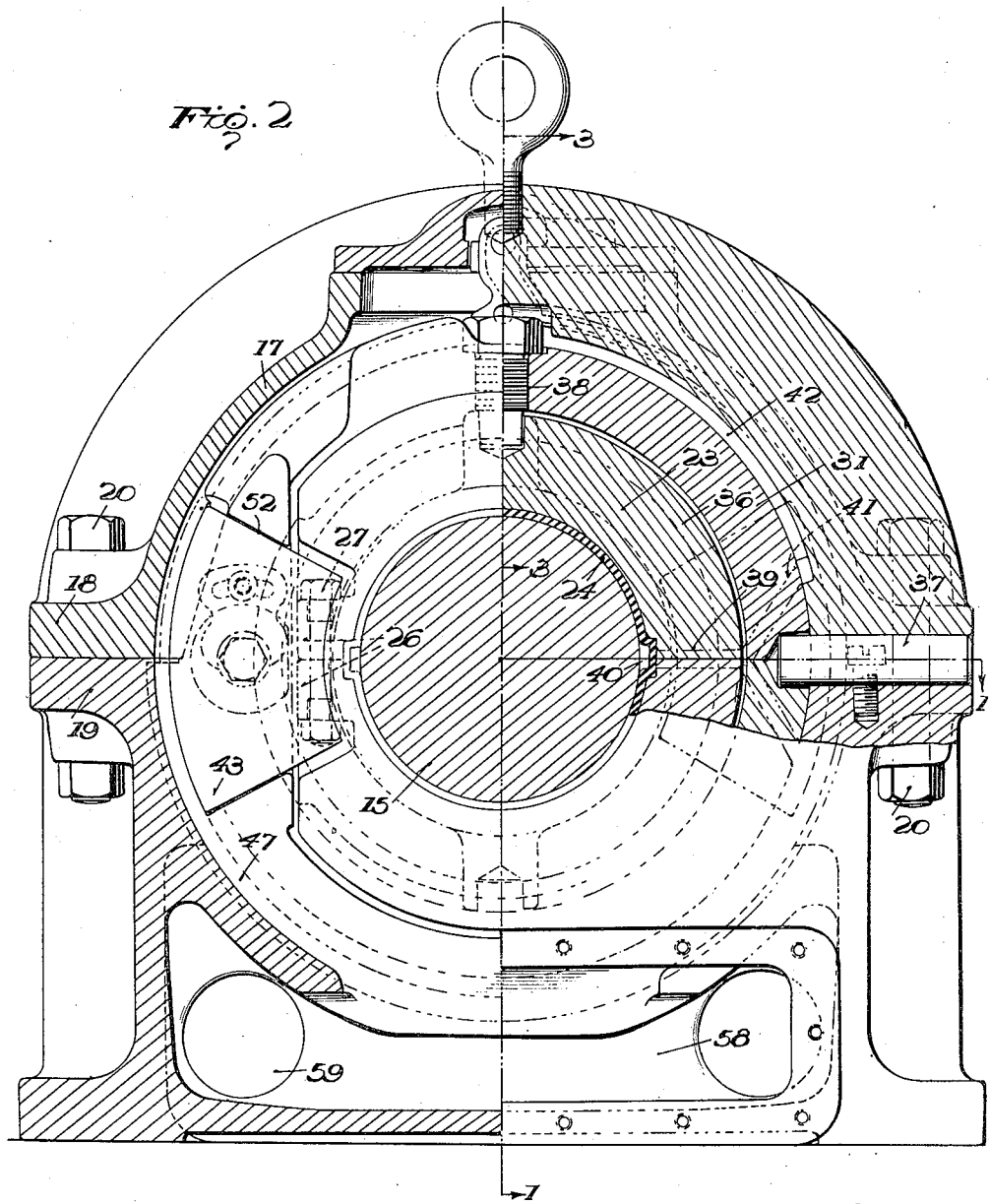

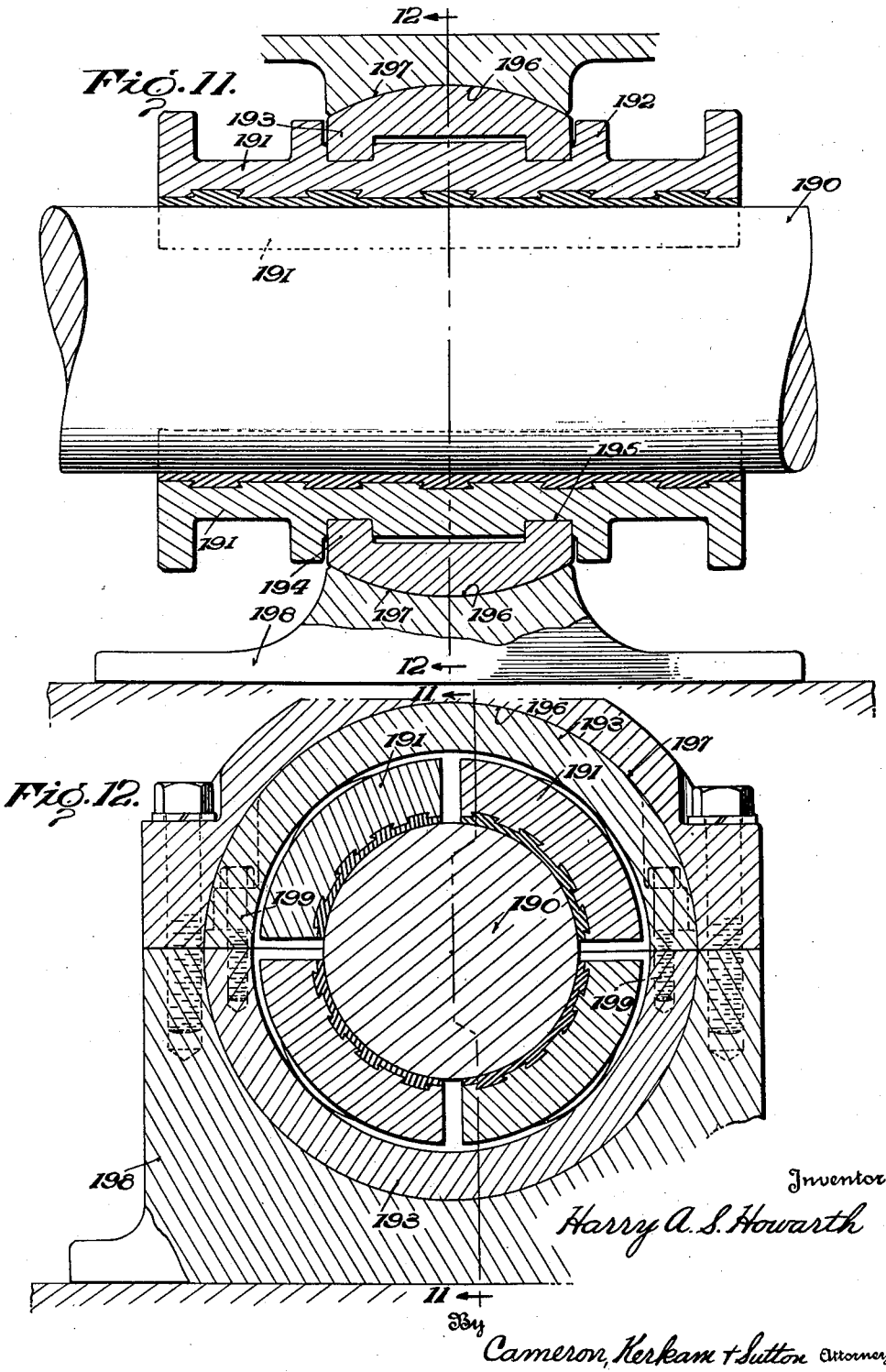

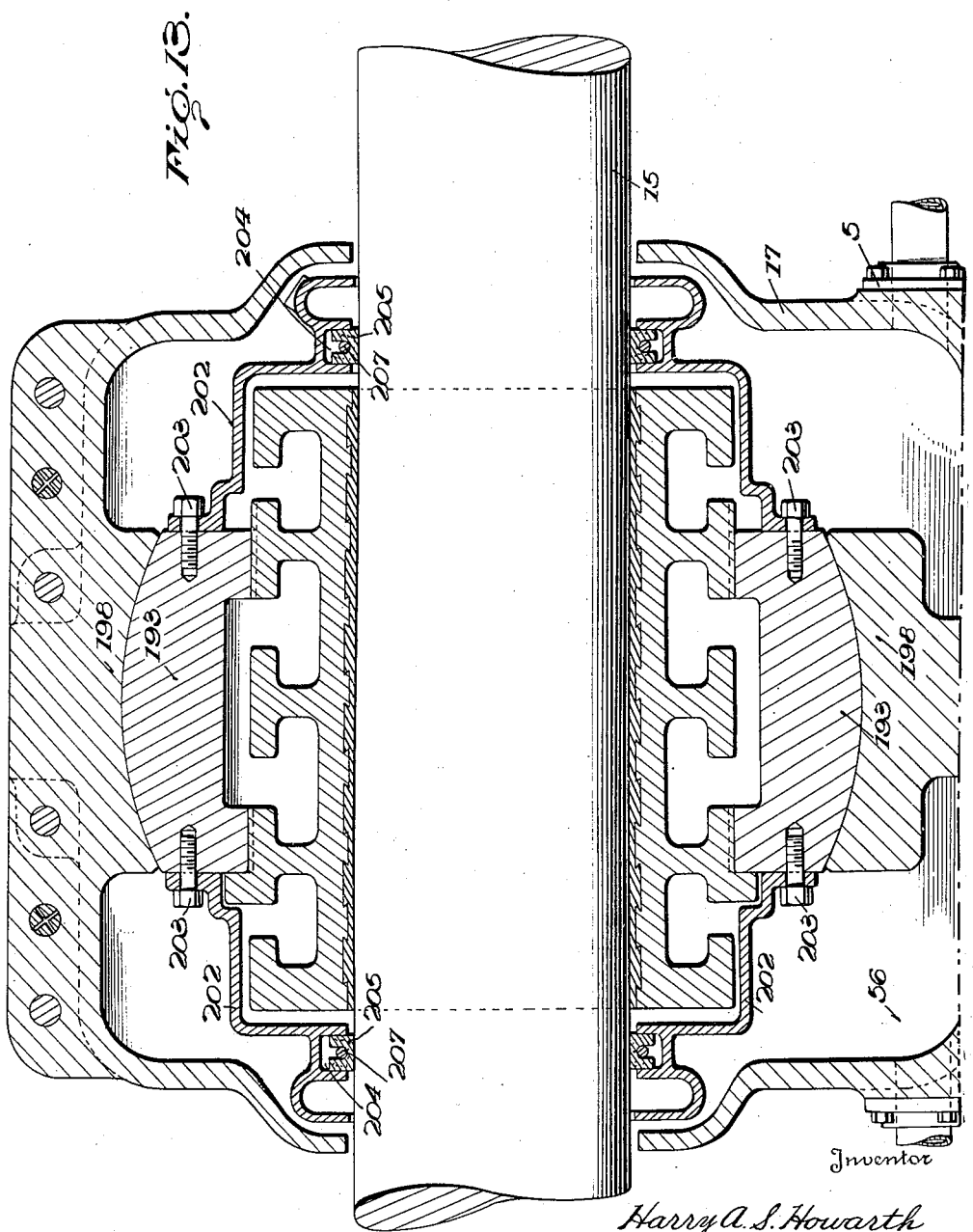

Patented Aug. 24, 1937

2,090,729

UNITED STATES PATENT OFFICE 2,090,729

RADIAL BEARING

Harry A. S. Howarth, Philadelphia, Pa., assignor to Kingsbury Machine Works, Inc., Philadelphia, Pa., a corporation of Delaware Application August 19, 1935, Serial No. 36,914

53 Claims. (Cl. 308—73)

This invention relates to bearings, and more particularly to radial bearings, such as journal bearings, and includes both radial bearings per se and radial bearings combined with thrust bearings.

It is known that the load on a shaft causes deflection of the shaft, and it has heretofore been proposed to so construct or mount a radial bearing that the axis of the bearing may become inclined to the axis of the shaft when it is unloaded so that it may more nearly conform with the position of the shaft when deflected by its load. But such self-aligning bearings do not compensate or provide for the curvilinear character of the shaft's deflection, because the deflection of the shaft causes its axis to become curvilinear rather than rectilinear. When the shaft carries a load which is overhung with respect to the radial bearing the shaft bends with its concavity directed downwardly. On the other hand, when the load is between two radial bearings the shaft bends with its concavity directed upwardly. In either event the curvilinear character of the axis of the shaft when loaded results in the shaft assuming a relationship with respect to each associated radial bearing member wherein the elements of the shaft are not parallel to the elements of said bearing member even though said radial bearing member may be mounted for self-aligning movement as heretofore referred to. It is desirable to provide a radial bearing which will preserve its predetermined clearance between the shaft and the associated bearing member or members throughout, i. e., to provide a radial bearing which is circumferentially rigid and which at the same time will conform to the deflection of the shaft to avoid concentration of stresses at one or both ends of the radial bearing.

It is an object of this invention to provide a radial bearing wherein the radial bearing member or members are so constructed as to render them flexible in the direction of the axis of the shaft while preserving their rigidity circumferentially of the shaft.

Another object of this invention is to provide a device of the type characterized which also includes provision for self-alignment so that the flexure of the radial bearing member or members need compensate for only that extent of deflection from the general direction of the axis of the loaded shaft that is a departure from a right line because of the curvilinear character of such deflection.

Another object of this invention is to provide a device of the type characterized which is so constructed that it may be used satisfactorily whether the deflection of the shaft is concave downwardly or concave upwardly.

Another object of this invention is to provide a radial bearing of the type characterized which may be combined with a thrust bearing at one or both extremities of the radial bearing and which by reason of the association of the radial and thrust bearing elements does not render the overall length of the combined bearing structure unduly large.

Another object of this invention is to provide a combined bearing of the type last referred to with improved means for lubricating either or both the radial bearing and the thrust bearing.

Another object of this invention is to provide a radial bearing member which is axially flexible and circumferentially rigid.

Another object of this invention is to provide a bearing member of the type last characterized with mounting means associated with the means providing axial flexibility and circumferential rigidity whereby the bearing member as a whole may move angularly to a plane at right angles to the axis of the shaft.

Another object of this invention is to provide a radial bearing which is rendered axially flexible and circumferentially rigid by the use of circumferentially extending ribs and wherein said ribs are so associated with the mounting of the radial bearing as to provide for the latter tilting in the direction of deflection of the shaft.

Another object of this invention is to provide an axially flexible and circumferentially rigid radial bearing with improved means for confining the oil in operative relation to the bearing members.

Another object of this invention is to provide an axially flexible and circumferentially rigid radial bearing with improved means for cooling the same.

Another object of this invention is to provide an axially flexible and circumferentially rigid radial bearing wherein the radial bearing members are composed of tiltable shoes.

Another object of this invention is to provide improved means for lubricating either or both a radial bearing and a thrust bearing.

Another object of this invention is to provide a radial bearing or a combined radial and thrust bearing as heretofore characterized which is simple in construction and highly efficient in operation.

Other objects will appear as the description of the invention proceeds.

The invention is capable of receiving a variety of mechanical expressions, some of which are illustrated on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures,—

Fig. 1 is partly an elevation and partly a section on the line 1—1 of Fig. 2 of a combined radial and thrust bearing embodying the present invention;

Fig. 2 is partly an end elevation and partly transverse sections taken on the lines 2—2 and 2'—2' of Fig. 1;

Fig. 3 is a partial section, as if taken on the line 3—3 of Fig. 2, of a similar embodiment but showing the radial bearing disposed between two thrust collars, instead of the use of only one thrust collar as in Fig. 1, and particularly illustrating means for lubricating the radial bearing of Figs. 1 and 2 from the periphery of the thrust collar;

Fig. 4 is an axial section of another embodiment of the present invention;

Fig. 5 is an axial section of yet another embodiment of the present invention;

Fig. 6 is a transverse section through the lubricating means of Fig. 5;

Fig. 7 is a partial axial section showing an embodiment of this invention wherein the circumferential ribs on the bearing shell provide the self-aligning mounting for the bearing shell;

Fig. 8 is an elevation partly in transverse section of an oil confining and collecting member of the present invention;

Fig. 9 is a developed plan view of the arcuate oil confining member of Fig. 8;

Fig. 10 is a schematic elevation partly in section illustrating cooling means that may be employed in embodiments of the present invention;

Fig. 11 is a schematic axial section and Fig. 12 is a schematic transverse section of an embodiment of the present invention employing tiltable bearing shoes; and Fig. 13 is a fragmentary axial section of an embodiment of the present invention illustrating improved means for confining the oil in operative relation to the bearing members.

In the form shown in Figs. 1 and 2 the invention is incorporated in a combined thrust and radial bearing, but it is to be expressly understood that the novel radial bearing here illustrated may be used separately from a thrust bearing, if desired, and also said radial bearing may be associated with and disposed between a pair of thrust bearings located at opposite extremities of the radial bearing (compare Fig. 3) by duplicating that part of the structure which is shown at the right of the vertical center line of Fig. 1 at the left of said center line.

As here illustrated the shaft 15, which may be any suitable shaft, is provided with a thrust collar 16 integral therewith or suitably keyed thereto. Surrounding said thrust collar and the adjacent portion of the shaft is a bearing housing 17 preferably made in halves so that the upper half of the bearing housing may be removed to gain access to the bearing members contained therein, the upper and lower halves of said bearing housing being shown as provided with flanges 18 and 19, respectively, that may be secured together by bolts 20. At opposite extremities said housing 17 is provided with oil confining means 21 and 22 of any suitable character and construction. Within said housing 17 is a radial bearing and a thrust bearing, the latter cooperating with the inner face of the thrust collar 16 and the former cooperating with the adjacent surface of the shaft.

In this embodiment the radial bearing takes the form of a bearing shell 23 which is provided with any suitable lining 24 of bearing metal and provided with any suitable oil distributing groove or grooves. To render said bearing shell axially flexible so that its axis may become of curvilinear shape and at the same time to render said bearing shell circumferentially rigid so that it will retain its designed circular shape and thereby preserve the predetermined running clearances between the surface of the shaft and the surface of the stationary radial bearing member or shell, said shell is made sufficiently thin so as to be yieldable axially and provided along its length with axially spaced circumferential ribs 25 which are of such size and shape as to give the desired circumferential rigidity to said shell. While the circumferential form of the shell is thus maintained by said circumferential ribs 25 the inherent elasticity of the metal of which the interrib portions of the shell are composed permits said shell to bend in the direction of its axis. The number and spacing of said ribs may vary in accordance with the desired axial flexibility and circumferential rigidity to be maintained.

Bearing shell 23 may be made in one piece if preferred, or as shown it may be made in halves, in which event the halves of the bearing shell may be provided with axially extending flanges 26 which may be secured together by bolts or screws 27. Said axially extending flanges 26 when used may be so designed as to give a predetermined degree of axial rigidity to the bearing shell. Thus they may extend continuously throughout the length of the bearing shell, or they may be interrupted, or they may be employed only adjacent the extremities of the bearing shell, etc., so that the stiffening function performed thereby shall bear a predetermined relationship to the flexibility of the shell as provided by the portions of the shell lying between the circumferentially extending stiffening ribs.

A bearing shell constructed as described may be supported in any suitable way so as to take advantage of its axial flexibility and permit it to yield to conform with the flexure of the shaft, but by preference said shell is mounted so that it may tilt as a whole and have what is ordinarily referred to as a self-aligning movement, to the end that the axis of the shell may lie generally in the direction of the axis of the shaft. As shown, two of the ribs 28, which in the embodiment of Fig. 1 are disposed on either side of the medial rib and which are spaced axially by approximately one-third of the length of the shell, engage at their cylindrical peripheral surfaces 29 with the inner cylindrical surfaces 30 of an annular member 31 provided exteriorly with a spherical surface 32 adapted to seat in a correspondingly shaped surface 33 suitably provided on or in the bearing housing 17. Annular member 31 is preferably made in halves suitably connected as by bolts or screws 34, so that it may be assembled around a shell, and it is also shown as provided with inwardly directed ribs 35 at its inner face which cooperate with the ribs 28 to prevent axial displacement between the member 31 and shell 23, said member 31 between said ribs 35 forming a groove which clears the medial rib 36.

Annular member 31 owing to its spherical seat at 32, 33 therefore provides for the self-aligning movement of the bearing shell as a whole, and at the same time it provides a support for said bearing shell which permits the shell to bend axially as heretofore described. The embodiment here shown possesses the advantage that it provides for the shell flexing to conform with a shaft whose flexure is concave upwardly as well as a shaft whose flexure is concave downwardly. The more common flexure met in practice is that wherein the shaft is flexed concave downwardly, and in the embodiment illustrated the bearing shell may flex so that its extremities are slightly below the portion centered by the ribs 28 while the central portion at medial rib 36 is slightly above the portion centered by the ribs 28. The shell is somewhat less flexible for flexing so that it is concave upwardly, in which event the ends of the shell would be slightly above the centered ribs 28 and the central portion at medial rib 36 would be slightly below the centered ribs 28, but the described construction provides sufficient flexibility in both directions so that it can be standardized as a bearing shell available for universal application. If the shell is designed for installation with a shaft whose known flexure is of that type heretofore referred to as concave upwardly, however, the annular member 31 could be designed to have engagement with ribs spaced axially by a somewhat larger proportion of the length of the shell than that shown in Fig. 1.

Annular member 31 may be retained in cooperation with its seat 33 in any suitable way, as by a dowel 37 entering a recess 37' provided in the periphery of said member, and member 31 may carry one or more dowels 38 entering recesses provided in the medial rib 36 to prevent relative rotation between the shell 23 and said member 31. The journal bearing may be provided with lubricant in any suitable way, the two ribs 28 being shown as provided with channels 39 which communicate with a distributing groove 40 in the face of the radial bearing member 24, said passages 39 also communicating through passages 41 in the member 31 with a channel 42 formed as a groove in the seat 33 and which may be supplied with lubricant in any suitable way, as for example with lubricant collected from the periphery of the thrust collar 16 as hereinafter explained in conjunction with Fig. 3.

In this embodiment a thrust bearing is shown in association with the radial bearing heretofore described in such a relationship therewith as to provide a particularly compact structure. As here illustrated the thrust bearing is composed of a pair of shoes 43, but any suitable number of shoes may be used. Said shoes have thrust bearing engagement with the inner face of the thrust collar 16 and are tiltably mounted in any suitable way so as to provide wedge-shaped oil films and maintain parallelism with the face of the thrust collar, as by providing each shoe with a hardened insert 44 received in a recess in the rear face of the shoe, and which may have shims interposed between said block and shoe if desired, said block having a spherical face 45 by which the shoe is tiltably mounted, as on the end of a jackscrew 46. The two shoes are preferably disposed symmetrically with respect to a vertical plane containing the axis of the shaft and the two jackscrews are shown as carried by a horseshoe-shaped supporting member 47 provided with an outwardly projecting peripheral rib 48 which is slidably received for rotation relatively to the shaft in a groove 49 suitably provided in the bearing housing, or as here illustrated in an axially projecting rib 50 carried by the radial rib 51 which provides the spherical seat for the member 31 in the lower half of the bearing housing. As shown in Fig. 2 said horseshoe-shaped supporting member 47 may be recessed as shown at 52 to properly locate the bearing shoes, these recesses permitting radial withdrawal of the bearing shoes, when the upper half of the bearing housing is removed, by rotating the U-shaped member 47 in its support. In order to shorten the length of the bearing the inner face of the bearing shoes are beveled as shown at 53, and the end of the bearing shell 23 is similarly beveled as shown at 54 so that the shoes may be disposed around and in radial alignment with the end of said bearing shell, the inner edge of the bearing shoes being made rectilinear rather than curvilinear if preferred. Any suitable means may be provided for supplying lubricant to the thrust bearing elements, but inasmuch as the embodiment illustrated is a two-shoe bearing no special lubricating means for the thrust bearing shoes is necessary. It is to be expressly understood, however, that a larger number of shoes may be employed if desired and suitable lubricating means may be provided for collecting oil from the periphery of the thrust collar 16, as is illustrated for example in Fig. 3. Any suitable means for cooling the oil may also be provided, a cooling coil being indicated at 55 and said coil being readily insertable as a unit into the oil reservoir 56 through an aperture closed by cover plate 57 which constitutes a support for the cooling coil and its connections. In order to provide for the free circulation of oil between the portions of the reservoir on either side of the rib 51 which provides a seat for the annular member 31 in the lower half of the bearing housing, the neck 58 of said rib is provided with one or more apertures 59 as shown in Fig. 2.

Referring now to Fig. 3 the shaft 60 is shown as provided with a pair of spaced thrust collars 61 and 62 between which is disposed a radial bearing 63 whose construction is or may be the same as heretofore described in conjunction with the embodiment of Figs. 1 and 2. Thrust collar 62 is shown as provided with an oil scraper 64 for collecting oil from the peripheral portions of said thrust collar and directing it inwardly through channel 65 to lubricate the thrust bearing members in cooperation with the inner face of said thrust collar, and which thrust bearing may be of any suitable construction, number of shoes, etc., as heretofore described in conjunction with Figs. 1 and 2. Thrust collar 61 is shown as provided with means for lubricating the radial bearing from oil collected from the periphery of said thrust collar, the oil so collected also being utilized to lubricate the thrust bearing associated with said thrust collar and which may also be of any suitable construction, number of shoes, etc., such for example as described in conjunction with Figs. 1 and 2.

As here illustrated the thrust collar is provided with a channel-shaped oil collecting ring 66 whereby oil entrained by the peripheral surface of the thrust collar 61 is carried upwardly within the channel 67 formed thereby to an oil scraper of any suitable construction whereby the collected oil is caused to flow through chamber 68 into one or more passages 69 suitably provided in the wall of the bearing housing. The oil so collected is shown as delivered under pressure through passage 70 to one or more nozzles 71 through which it is forced as a jet onto the face of the thrust collar 61 to insure a copious lubrication of the thrust bearing elements associated therewith, and the remainder of the oil flowing through said passage 69 is led through passages 72 and 73 to the channel 74 surrounding the annular member 31 by which the radial bearing shell is mounted for self-aligning movement. From channel 74 the oil may be distributed to the bearing surface of the radial bearing member as in the manner illustrated in Fig. 1.

While the oil collecting member 66 may be of any suitable construction, it may be made of the form shown in Figs. 8 and 9. As here illustrated the channel-shaped member 66 is an arcuate member 75 of nearly 180° in extent which may be formed of sheet metal and which carries at its lateral extremities a pair of strips 76 suitably attached to the member 75 as by rivets and having, as shown in Fig. 9, a slight convergence toward each other so that the width of the channel 67 formed therebetween is of gradually diminishing cross section, while the radial dimension of said channel is kept uniform. Thereby the oil forced through said channel by the periphery of the thrust collar is progressively placed under pressure as it approaches the oil collecting edge 77. The oil collecting member 78 as here shown takes the form of a block adapted to fit into a recess, as 79 in Fig. 3, formed in the bearing housing and provided with a passage 80 leading from the oil collecting edge 77 to one or more lateral openings 81 provided on one or both sides of the block. If only one aperture 81 is used, it registers with such a passage as shown at 69 in Fig. 3, but as shown in said figure a second aperture 81 may register with a second passage 82 communicating with a pipe 83 which may lead oil under pressure to any other suitable bearing to be lubricated. Thus the oil collecting means described may provide a source of oil under pressure whereby oil collected by the rotating thrust collar may be utilized to lubricate the machine with which the shaft and bearings are associated as well as the bearings themselves.

Channel-shaped member 66 may be held in rubbing contact with the periphery of the thrust collar 61 so as to retain the oil under pressure in the channel 67 in any suitable way. As illustrated member 75 has suitably attached to the outer face thereof, as by screws or rivets, a plurality of springs 84 which are designed to engage the circumferential wall of the bearing housing around the thrust collar, so that when said member 75 is in position the springs 84 react against said circumferential wall of the housing to urge the channel-shaped oil collecting member into rubbing contact with the periphery of the thrust collar and prevent admission of air between the periphery of the thrust collar and the lateral walls 76 of said member. The member 75 is preferably attached as by riveting to a flange 85 on the block 78 so that the oil directing and collecting means may be installed as a unit on the periphery of the thrust collar.

Another embodiment of this invention is shown in Fig. 4 wherein the shaft 90 is provided with an axially flexible but circumferentially rigid bearing shell 91 of the general construction heretofore described in conjunction with the embodiment of Figs. 1 to 3. In this embodiment, however, the end circumferential ribs 92 are shown as of somewhat stiffer construction than some of the intermediate ribs 93, and the pair of ribs 94 which make cylindrical contact at 95 with the supporting member 96 are also shown as of stiffer construction than the ribs 93. In this embodiment the ribs 94 are spaced axially by a somewhat greater distance than in the embodiment of Fig. 1, so that two intermediate ribs 97 lie between said ribs 94.

This embodiment as illustrated does not employ spherical surfaces between the annular member 96 and the bearing housing 98, but it may employ the construction of Figs. 1 to 3 if preferred. Member 96 is provided with a groove 99 in its outer peripheral surface and the lateral portions of the bottom surface of said groove 99 are cut away as shown at 100 so as to provide a centrally raised cylindrical surface 101 which engages the inner cylindrical surface 102 of a rib 103 suitably provided on or in the bearing housing. Thereby member 96 is mounted on the bearing housing by an axially narrow cylindrical surface which enables self-aligning movement of the member 96 to take place. Member 96 may be retained in position in any suitable way as by a dowel 104 carried by the member 96 and entering a recess 105 in the bearing housing. As in the embodiment of Figs. 1 and 2 the bearing shell may be made in halves suitably secured together at flanges 106 as by bolts or screws 107. The member 96 is also preferably made in halves suitably secured together as indicated at 108 so that the halves may be assembled around the bearing shell. Centering ribs 109 project inwardly from the inner face of said member 96 for cooperation with the ribs 94 to prevent relative axial displacement. In this embodiment the shell 91 is secured in position by bolts or screws 110 projecting through a flange 111 suitably provided on the bearing housing, and lubrication of the radial bearing is effected by an oil collecting ring 112 which rides on the shaft and extends downwardly into the oil in the well provided in the lower half of the housing 98.

In the embodiment shown in Fig. 5 the shaft is provided with a thrust collar 113 integral therewith or suitably keyed thereto. Cooperating with opposed faces of said thrust collar 113 are thrust bearings 114 and 115 of any suitable construction. As here shown the shoes of thrust bearing 114, which may be of any suitable number, three or six shoes for example, are tiltably mounted at 116 on an equalizing block 117 having a spherical face 118 for cooperation with a corresponding face 119 provided in any suitable way on or in the bearing housing. Said equalizing block may be centered for purposes of assembly by springs 118' in the lower half of the bearing and any suitable means may be employed for retaining the equalizing block and shoes in operative position. The shoes of thrust bearing 115, which may also be of any suitable number, for example two, are tiltably mounted at 120 on a suitable support 121 here shown as a flange projecting inwardly from the bearing housing, jackscrews (not shown) being preferably employed as an adjustable support therefor as in the embodiment of Fig. 1. Cooperating with the shaft at either side of the thrust collar 113 are radial bearings 122 and 123, bearing 122 being shown as of somewhat greater axial length than bearing 123. Both of the radial bearings 122 and 123 are shown as having axially flexible circumferentially rigid bearing shells, the same being provided with a plurality of axially spaced circumferentially rigid ribs 124 as heretofore described.

In this embodiment the bearing shells are mounted by annular members 125 and 126 which are generally channel-shaped in cross section, and which have supporting engagement with the bearing shells in the grooves formed between contiguous circumferential ribs, instead of with the periphery of such ribs as in the embodiments heretofore described. Member 125 has at the inner extremity of its two legs cylindrical surfaces 127 which engage raised cylindrical surfaces 128 formed on the periphery of the bearing shell between the ribs 124. At its outer periphery said member 125 has a raised cylindrical surface 129 which engages a cylindrical surface 130 provided in any suitable way on or in the bearing housing 131, but spherical surfaces of engagement may be used if preferred. Said member 125 is also provided with a pair of circumferential ribs 132 which lie on either side of the rib 133, which provides the cylindrical surface 130, and enter grooves 134 suitably provided in the bearing housing, so that said member 125 is retained in position axially of the shaft.

Member 126 is similarly provided with cylindrical surfaces of contact between the extremities of its legs and the periphery of the bearing shell, and has a groove 135 in its outer peripheral surface the bottom of which provides a cylindrical surface of engagement 136 with a cylindrical surface 137 suitably provided on or in the bearing housing, but spherical surfaces of engagement may be used if preferred. Member 126 is thus retained axially of the shaft by embracing the rib 138 which provides the surface 137. While different forms of supporting members 125 and 126 have thus been shown in Fig. 5 it will be understood that either form, or other forms herein disclosed, may be used for both radial bearings.

In this embodiment the radial bearings are lubricated by oil collected from the periphery of the thrust collar 113. While the oil collecting means may be of the character heretofore described in conjunction with Figs. 3, 8, and 9, a somewhat different construction is here illustrated. Referring to Fig. 6, the oil collecting member is shown as in the form of a ring 142 which embraces substantially the entire periphery of the thrust collar 113. Said member 142 is of substantially the width of the periphery of said thrust collar and has at its two lateral edges inwardly projecting ribs 143 which are held in rubbing contact with the periphery of the thrust collar, said member being resiliently supported by a plurality of springs 144 suitably attached to the member 142, as by rivets, and engaging the circumferential wall of the bearing housing surrounding said thrust collar.

Adjacent the top of the bearing said member 142 is provided with an enlargement 145 which has lateral openings 146 in opposite sides thereof. Depending from the enlargement 145 is an oil collecting edge 147 which, as shown in Fig. 5, occupies only the medial portion of the peripheral surface of the thrust collar so that grooves 148 are left at either side thereof. Adjacent the bottom of the collar said oil collecting member 142 has an oil inlet aperture 148 to and through which the oil may rise through passages 149 formed in the bearing housing. At the opposite end of said member 142 but adjacent the inlet apertures 148 is an oil scraping ledge 150 whereby the oil which flows thereto through the channels 148 is collected thereby and deflected laterally in one or both directions through an aperture or apertures 151 in the ribs 143 and into the thrust bearing chamber or chambers adjacent the bottom thereof. As here shown the oil is deflected into the chamber containing thrust bearing 114 only, as thrust bearing 115 is shown as composed of two shoes, but it is apparent that the chamber of the latter bearing may similarly be filled with oil if desired.

Therefore the oil carried upwardly within the channel-shaped space between member 142 and the periphery of the thrust collar is partly collected by the oil collecting edge 147, whence it flows laterally through the apertures 146 to channels 152 suitably formed in the bearing housing at either side of the thrust collar and leading to channels 153 in the members 125 and 126 in communication with channels in the medial ribs 124 of the radial bearing shells analogously as in the embodiment of Fig. 1. The remainder of the oil flows around said oil collecting edge 147 through the grooves 148 and continues around the periphery of the thrust collar until it is removed and deflected by the oil scraping ledge 150 into the chamber containing the thrust bearings 114. The oil rises in said chamber until said chamber is completely filled with oil, suitable filler pieces being used and the parts defining said chamber being so related as to minimize escape of oil from said chamber axially of the shaft. From said thrust bearing chamber the oil may flow outwardly through apertures 156, formed in the lateral wall of the chamber containing the enlargement 145, into the annular space surrounding the member 142, between the latter and the circumferential wall of the bearing housing surrounding the thrust collar, and thereby return to the oil well 157 in the base of the bearing housing through one or more apertures 158 formed in the wall 159 that surrounds the lower half of the thrust collar, where it may come into immediate contact with a cooling coil. As the thrust bearing 115 has only two shoes, special lubricating means therefore are unnecessary, but the chamber containing the same is in open communication with the oil well, as by suitably arranged apertures, so that free ingress and egress of oil is permitted.

As shown at the left in Fig. 5, the oil flowing to the journal bearing may be returned to the oil well through one or more passages 160 communicating with one or both extremities of a groove 161, and a similar provision may be made for the right-hand journal bearing of Fig. 5. The neck which supports said wall 159 from the base of the bearing housing has apertures 149 through which the oil may flow freely between the portions of the oil well at opposite sides of the thrust collar. Any suitable means may be provided for cooling the oil in the well 157 a cooling coil 162 carried by a removable cover plate 163 being shown in Fig. 6.

The embodiment of Fig. 7 illustrates how the circumferential ribs themselves may provide the self-aligning mounting for the bearing shell. As here illustrated the bearing shell 170 has a plurality of circumferentially rigid ribs 171. Two of said ribs, designated 172 and having a suitable spacing axially of the bearing shell, are provided with axially curved surfaces 173 so that the peripheral surfaces of said two ribs 172 lie in a common spherical surface. The spherical surfaces 173 thus provided are designed to seat in a spherical surface carried by or provided in the bearing housing, as in the embodiments of Figs. 1 to 3, so that by reason of the coaction of said spherically faced ribs 172 with the spherical seat therefor, said shell has self-aligning movement. In order to prevent the flexure of the bearing shell from distorting said spherical surfaces 173 out of the common spherical surface and thereby interfering with the self-aligning movement of the bearing shell, a spacing ring 174 made in halves suitably secured together is interposed between said ribs 172 so as to maintain a predetermined spacing therebetween. As shown the intermediate rib 175 may be made of such length radially that the ring 174 seats on its periphery. Oil may be supplied to the bearing surface in any suitable way as through passages 176 formed in one or more of said ribs and communicating with axially extending grooves 177 in the face of the radial bearing member. As illustrated, said axially extending grooves terminate in oil sealing circumferential grooves 178 disposed adjacent the opposite extremities of the radial bearing member.

Fig. 10 illustrates schematically how the present invention may be combined with means to facilitate the cooling of the bearing shell. As here illustrated, the axially flexible and circumferentially rigid bearing shell 180 has a suitable number of axially spaced circumferentially rigid ribs 181, the medial rib being illustrated as provided with a radial extension 182 which terminates in a cylindrical peripheral surface 183 that is relatively narrow in its axial dimension and seats on a cylindrical surface 184 suitably formed in or on the bearing housing, and here illustrated as provided by the bottom of a groove 185. Owing to the narrow axial dimension of the surface of contact 183, the bearing shell 180 may have adequate self-aligning movement. To provide a passage through which a cooling medium may be circulated in heat interchanging relation with the bearing shell and maintain the same relatively cool, deeply corrugated, tubular members 186 having their inwardly projecting corrugations spaced axially in conformity with the spacing of the grooves 188 lying between the ribs 181 are suitably secured at their extremities, as by brazing or welding, to the peripheries of said ribs 181, whereby a zigzag channel is formed between the outer peripheral surface of the bearing shell 180 and the inner surface of the deeply corrugated members 186. The cooling medium, as cooling water, may be conducted to and from the cooling passages thus formed by conduits communicating with said passages and suitably attached to the stationary bearing member. The relatively thin flexible members 186 do not interfere with the axial flexing of the bearing shell, while they provide a relatively inexpensive and water-tight enclosure therefor whereby the grooves between the ribs 181 may be utilized for circulating the cooling medium therethrough.

In the embodiments so far described the radial bearing members have been illustrated as in the form of bearing shells, which may be either in one piece or formed in halves suitably secured together. As hereinbefore indicated, however, the invention is not restricted to the use of bearing shells, but may be employed in conjunction with circumferentially tiltable bearing shoes. Referring to Figs. 11 and 12 the shaft 190 is shown as surrounded by a suitable number, here shown as four, circumferentially tiltable bearing shoes 191 which are rendered relatively rigid in a circumferential direction by the outwardly projecting spaced ribs 192 formed thereon, but which are flexible in an axial direction for the same reasons as heretofore explained in connection with the axially flexible bearing shells described.

Each of said bearing shoes is tiltably mounted on a surrounding cage member 193, as by the interposition of blocks with curved faces on the rear of the shoes engaging the inner circumferential surface of said cage 193. Cage 193 is shown as channel-shaped in cross section and has inwardly directed legs 194 which are received in the inter-rib grooves 195 at the rear of the shoes, so as to retain said shoes in their proper axial position. Where, as preferred, the axially flexible construction is also combined with a provision for self-aligning movement, said cage is made with a spherical peripheral surface 196 and cooperates with a corresponding spherical surface 197 provided in any suitable way on or in the bearing housing 198. The cage 193 is preferably made in halves suitably connected as by bolts or screws 199, so that the halves thereof may be assembled with the contained shoes around the shaft, or if desired said cage may be split on a medial radial plane, and the halves suitably secured together as by bolts or screws, so that the two halves may be assembled axially of the shaft when this method of assembly is preferred.

When the radial bearing is composed of shoes as just described the intershoe spaces provide passages through which oil may flow axially of the shaft, and provision may be made for enclosing the radial bearing so as to prevent escape of oil axially of the shaft. Fig. 13 illustrates a construction which may be employed and which operates to retain the shoes in position axially of the shaft. As here shown housing members 202 are attached, as by bolts or screws 203, to the lateral faces of the cage 193 and extend axially and then radially into adjacency with the shaft, so that the two members 202 when taken in conjunction with the cage 193 constitute a complete enclosure for the radial bearing members which may be of any suitable construction and mounted in any suitable way. Each of said members 202 is provided with an inwardly directed groove 204 in which is mounted a seal ring 205, preferably made in halves and held in resilient rubbing contact with the periphery of the shaft 15 as by an elastic or resilient spring or ring 207 positioned in the groove formed in the back of the ring 205. Thereby escape of oil axially of the shaft from the enclosure containing the radial bearing members is effectively prevented. The construction illustrated permits the shoes to be slid axially into position, from the left as shown in Fig. 13, and the members 202 then retain the shoes against axial displacement. As will be apparent, the same construction may also be employed, if desired, for providing an oil confining enclosure for the radial bearing where the radial bearing member is a complete shell surrounding the shaft instead of a plurality of shoes. The support 198 for the spherically faced cage ring 193 may be an exposed ring or it may be a part of a housing as in other embodiments described. On the other hand, if preferred, the members 202 may be supported directly from a bearing housing. It is to be noted that when the members 202 are supported from the cage 193 they move therewith as the shaft bends and do not interfere with the function of the self-aligning provision or the axial flexibility of the bearing shoes or shell of the radial bearing.

It will therefore be perceived that by the present invention a radial bearing has been provided which is possessed of axial flexibility so that it may bend curvilinearly to maintain a predetermined running clearance between the relatively rotatable bearing surfaces throughout the length of the bearing, avoiding the concentration of stresses that might otherwise arise at one or both ends of the bearing. At the same time the construction provides circumferential rigidity so that the axial flexing is not accompanied by circumferential distortion to vary the predetermined running clearances between the relatively rotatable bearing surfaces circumferentially of the shaft. While an axially flexible radial bearing as described may omit the provision for self-aligning movement, and it is to be expressly understood that such is within the broader aspects of the present invention, the present invention in its preferred embodiment also contains provision whereby the radial bearing may tilt axially by way of self-aligning movement so as to take up the position wherein its axis lies generally in the direction of the axis of the flexed shaft, and thereby the radial bearing member or members need flex only to the extent required to conform with the departure of the curvilinear character of the axis from the tangent to the curve. This is true whether the radial bearing comprises a shell which completely surrounds the shaft or is composed of a plurality of tiltably mounted bearing shoes.

The self-aligning ring mounting used around the shell permits employment of materials that are peculiarly adapted to the requirements of each part involved. Thus the housing may be made of steel, the mounting ring of cast iron or hardened steel, and the shell or shoes of steel casting, bronze casting, or other suitable elastic metal. This is true whether axially narrow cylindrical surfaces of contact or spherical surfaces of contact are provided at the seat affording the self-aligning movement of the radial bearing member or members. It is to be expressly understood that spherical or cylindrical surfaces of contact may be employed as preferred in any of the several embodiments of the invention where the mounting for the radial bearing provides for self-aligning movement.

The present invention has particular utility when incorporated in radial bearings that are relatively long, although the invention is also equally available for shorter bearings where the load per square inch is relatively high so that a substantial flexure of the shaft may be involved. The axial spacing of the planes of support of the flexible bearing members and the proportion of the length lying between the same may be widely varied to accord with the conditions under which the bearing is to be used. The invention is equally available whether the character of the load is such as to cause a flexure that is concave downwardly or a flexure that is concave upwardly. The embodiment of Figs. 1 to 3 is one that is suitable for general use, and may be readily standardized because, while the spacing of the supports which engage circumferential ribs axially of the shaft is particularly designed for a flexure that is concave downwardly, this spacing is also ordinarily suitable for bearings where the flexure is concave upwardly, inasmuch as the actual flexure within the length of the bearing is likely to be less, when the load is applied between two radial bearings, than when the load is overhung with respect to a single radial bearing. However, when the known use is such as to involve a flexure that is concave upwardly, the axial spacing of the circumferential lines of support for the flexible shell may include a somewhat larger proportion of the length of the radial bearing, as shown at the right in Fig. 5.

This latter embodiment also shows the use of radial bearings of different length depending upon the loads to be sustained. Thus in Fig. 5 the load on the shaft at that portion of the shaft which is to the left of the thrust collar is assumed to be the greater, and the left-hand bearing shell is made longer. On the other hand, the load on the shaft to the right of the thrust collar is assumed to be less than that to the left and the flexure to be concave upwardly, and the length of the bearing shell and the axial spacing of the circumferential supports therefor are shown as suitable for this condition.

While it is contemplated that the present invention may be used in radial bearings not associated with thrust bearings, and it is to be expressly understood that such are included within the present invention, this invention also provides means whereby a radial bearing having the characteristics heretofore discussed may be combined with a thrust bearing at one or both ends thereof, or a pair of radial bearings having the characteristics heretofore discussed may be provided at either side of a double acting thrust bearing as in Fig. 5. In any event the construction is such as to provide a relatively compact combined thrust and radial bearing which utilizes the housing for the radial bearing to sustain and transmit to the supporting structure the thrust load or loads of the thrust bearing or bearings.

While bearings embodying the present invention may be lubricated in any suitable way and the oil supplied through any suitable system of grooving, and while pressure lubrication or other forms of lubrication may be used with any of the several embodiments of this invention as preferred, automatic lubricating means associated with the thrust collar for supplying copious quantities of oil under pressure have been provided by the present invention, and the oil so collected from the collar may not only be used to lubricate either or both the radial bearing and the thrust bearing, but may be conveyed to a distance for the lubrication of one or more other bearings more or less remote from said collar. If preferred, however, any other suitable lubricating means may be employed with the various embodiments of this invention.

Improved means have also been provided for confining the oil in operative relationship to the radial bearing members whether in the form of a shell or a plurality of shoes, and whether supported from the housing or the member providing a self-aligning movement; for utilizing an axially flexible bearing shell of the construction disclosed so as to facilitate cooling of the shell; and for collecting and distributing oil to either or both a radial bearing and a thrust bearing which may be used in other constructions of bearing than here illustrated. The present invention also provides a radial bearing, or a combined radial and thrust bearing, which is not only simple and compact in structure, but one which is highly efficient in operation.

While the embodiments of the invention illustrated on the drawings have been described with considerable particularity, it is to be expressly understood that the invention is not restricted thereto, as the same may receive a variety of mechanical expressions, some of which will now readily suggest themselves to those skilled in the art. Any of the radial bearing structures shown may be used either alone or in combination with a thrust bearing at either one or both extremities thereof, and where a combined radial and thrust bearing is used it is to be expressly understood that the radial bearing may take the form of any of the several radial bearings disclosed while the thrust bearing may be of any suitable construction, other than that specifically illustrated. Other forms of lubricating means may be employed and the novel lubricating means of this invention may be used independently of other features of this invention. Also, as heretofore pointed out, tiltable bearing shoes having the characteristics discussed in conjunction with flexible bearing shells may be used, and any of the several forms of support for a flexible shell may be suitably modified for use as a support for tiltable flexible shoes. Changes may be made in the details of construction, arrangement, size, proportion, material, etc., and certain features may be used without other features, without departing from the spirit of this invention. Reference is therefore to be had to the appended claims for a definition of said invention.

What is claimed is:

1. In a radial bearing, in combination with a shaft, relatively stationary radial bearing means therefor including one or more radial bearing members having axial flexibility and circumferential rigidity in a plurality of axially spaced planes intermediate the length thereof, and means for mounting said radial bearing means in operative relationship to said shaft.

2. In a radial bearing, in combination with a shaft, relatively stationary radial bearing means therefor including one or more radial bearing members having radially extending ribs to render the same circumferentially rigid, one or more of the ribs on each member being unrestrained at its periphery and each member being relatively thin between said ribs to render the same axially flexible, and means for mounting said radial bearing means in operative relationship to said shaft.

3. In a radial bearing, in combination with a shaft, relatively stationary radial bearing means therefor including one or more radial bearing members which are axially flexible and provided with ribs to render the same circumferentially rigid throughout the length thereof, and means for mounting said radial bearing means to tilt axially of said shaft.

4. In a radial bearing, in combination with a shaft, relatively stationary radial bearing means therefor including one or more radial bearing members which are axially flexible and provided with ribs to render the same circumferentially rigid, and means for supporting said radial bearing means at axially spaced planes spaced from the ends of each member whereby the same may flex with respect thereto.

5. In a radial bearing, in combination with a shaft, relatively stationary radial bearing means therefor including one or more radial bearing members which are axially flexible and provided with ribs to render the same circumferentially rigid, and means for supporting said radial bearing means at axially spaced planes, intermediate the extremities thereof, said last named means being mounted to tilt with the shaft.

6. In a radial bearing, in combination with a shaft, relatively stationary radial bearing means therefor including one or more bearing members which are axially flexible and provided with ribs to render the same circumferentially rigid, and means cooperating with one or more of said ribs for supporting said radial bearing means so that the same may flex with respect to said supporting means, the remainder of said ribs being unrestrained at their peripheries.

7. In a radial bearing, in combination with a shaft, relatively stationary radial bearing means therefor including one or more radial bearing members which are axially flexible and provided with ribs to render the same circumferentially rigid, and means cooperating with one or more of said ribs for supporting said radial bearing means, the remainder of said ribs being unrestrained at their peripheries, said supporting means being mounted to tilt so that said radial bearing means may tilt as a whole with the shaft.

8. In a radial bearing, in combination with a shaft, relatively stationary radial bearing means therefor including one or more bearing members which are axially flexible and provided with ribs to render the same circumferentially rigid, and means providing a pair of circumferentially extending axially spaced supports for said radial bearing means cooperating therewith in axially spaced planes intermediate the length of each member whereby said radial bearing means is free to flex with respect to said supports lengthwise of the shaft.

9. In a radial bearing, in combination with a shaft, relatively stationary radial bearing means therefor including one or more bearing members which are axially flexible and provided with ribs to render the same circumferentially rigid, means providing a pair of circumferentially extending axially spaced supports for said radial bearing means cooperating therewith in axially spaced planes intermediate the length of each member whereby said radial bearing means is free to flex with respect to said supports lengthwise of the shaft, and means for mounting said last named means whereby said radial bearing means may tilt as a whole with the shaft.

10. In a radial bearing, in combination with a shaft, relatively stationary radial bearing means therefor including one or more radial bearing members which are axially flexible and provided with ribs to render the same circumferentially rigid, and supporting means for said radial bearing means engaging the periphery of two of said ribs disposed intermediate the ends of each member.

11. In a radial bearing, in combination with a shaft, relatively stationary radial bearing means therefor including one or more radial bearing members which are axially flexible and provided with ribs to render the same circumferentially rigid, supporting means for said radial bearing means engaging the periphery of two of said ribs disposed intermediate the ends of each member, and means for mounting said supporting means whereby said radial bearing means may tilt as a unit axially of the shaft.

12. In a radial bearing, in combination with a shaft, relatively stationary radial bearing means therefor including a radial bearing shell provided with radially projecting ribs to render the same circumferentially rigid, said shell being relatively thin to render the same axially flexible between said ribs, and means cooperating with said shell at planes spaced axially thereof but intermediate the ends thereof to mount said shell so that it may flex with respect to said mounting means.

13. In a radial bearing, in combination with a shaft, relatively stationary radial bearing means therefor including a radial bearing shell provided with radially projecting ribs to render the same circumferentially rigid, said shell being relatively thin to render the same axially flexible between said ribs, means cooperating with said shell at planes spaced axially thereof but intermediate the ends thereof to mount said shell so that it may flex with respect to said mounting means, and means for supporting said mounting means so that said radial bearing shell may tilt as a whole with the shaft.

14. In a radial bearing, in combination with a shaft, relatively stationary radial bearing means therefor including a bearing shell provided with radially extending ribs to render the same circumferentially rigid, said shell being axially flexible between said ribs, and means peripherally engaging a pair of said ribs intermediate the ends of said shell for supporting said shell to flex with respect to said supporting means.

15. In a radial bearing, in combination with a shaft, relatively stationary radial bearing means therefor including a bearing shell provided with radially extending ribs to render the same circumferentially rigid, said shell being axially flexible between said ribs, means peripherally engaging a pair of said ribs intermediate the ends of said shell for supporting said shell to flex with respect to said supporting means, and means for mounting said supporting means so that said radial bearing shell may tilt as a whole with the shaft.

16. In a radial bearing, in combination with a shaft, relatively stationary radial bearing means therefor including an axially flexible radial bearing shell provided with radially extending ribs to render the same circumferentially rigid, and an annular supporting member for said shell engaging said shell circumferentially at two axially spaced planes intermediate the length thereof whereby said shell may bend between and at both sides of said supporting means.

17. In a radial bearing, in combination with a shaft, relatively stationary radial bearing means therefor including an axially flexible radial bearing shell provided with radially extending ribs to render the same circumferentially rigid, an annular supporting member for said shell engaging said shell circumferentially at two axially spaced planes intermediate the length thereof whereby said shell may bend between and at both sides of said supporting means, and means mounting said annular member so that said annular member and shell may tilt as a unit with the shell.

18. In a radial bearing, in combination with a shaft, relatively stationary radial bearing means therefor including a bearing shell provided with radially extending ribs to render the same circumferentially rigid, said shell being axially flexible between said ribs, and an annular member engaging said shell in two radial planes intermediate the length of said shell and providing a support for said shell whereby the same may flex with respect to said annular member.

19. In a radial bearing, in combination with a shaft, relatively stationary radial bearing means therefor including a bearing shell provided with radially extending ribs to render the same circumferentially rigid, said shell being axially flexible between said ribs, an annular member engaging said shell in two radial planes intermediate the length of said shell and providing a support for said shell whereby the same may flex with respect to said annular member, and means for mounting said annular member whereby said annular member and shell may tilt as a unit with the shaft.

20. In a radial bearing, in combination with a shaft, relatively stationary radial bearing means therefor including a bearing shell provided with radially extending ribs to render the same circumferentially rigid, said shell being axially flexible between said ribs, an annular member engaging said shell in two radial planes intermediate the length thereof and providing a support for said shell whereby the same may flex with respect to said annular member, and means having a spherical surface cooperating with a spherical surface on said annular member whereby said annular member and shell are mounted to tilt as a unit with the shaft.

21. In a radial bearing, in combination with a shaft, a radial bearing shell therefor provided with radially extending ribs to render the same circumferentially rigid, said shell being axially flexible between said ribs, supporting means for said shell cooperating with one or more ribs intermediate the ends of said shell, the remainder of said ribs being peripherally free, and means for lubricating said bearing including passages extending through said supporting means and one or more of said ribs to convey oil to the relatively rotatable bearing surfaces between said shaft and shell.

22. In a radial bearing, in combination with a shaft, a radial bearing shell therefor provided with radially extending ribs to render the same circumferentially rigid, said shell being axially flexible between said ribs, supporting means cooperating with the periphery of a pair of said ribs spaced axially of the shaft and disposed intermediate the extremities of said shell, and means for lubricating said radial bearing including passages extending through said supporting means and one or both of said ribs to convey oil to the relatively rotatable bearing surfaces between said shaft and shell.

23. In a radial bearing, in combination with a shaft, a radial bearing shell therefor provided with radially extending ribs to render the same circumferentially rigid, said shell being axially flexible between said ribs, a member cooperating with axially spaced ribs disposed intermediate the extremities of said shell for supporting said shell, means for supporting said member and providing for axially tilting movement of said member with respect to said supporting means, and means for lubricating said radial bearing including passages formed in said member and one or more of said ribs and a passage communicating therewith for conveying oil to the relatively rotatable bearing surfaces of said shaft and shell.

24. In a combined radial and thrust bearing, in combination with a shaft and a thrust collar thereon, a radial bearing cooperating with said shaft and including one or more axially flexible bearing members provided with ribs to render the same circumferentially rigid, means for mounting said radial bearing in cooperative relationship with said shaft, and a thrust bearing cooperating with a face of said collar and disposed around said radial bearing means in radial alignment with the extremity thereof.

25. In a combined radial and thrust bearing, in combination with a shaft and a thrust collar thereon, a radial bearing cooperating with said shaft and including one or more axially flexible bearing members provided with ribs to render the same circumferentially rigid, means for mounting said radial bearing in cooperative relationship with said shaft, and a thrust bearing cooperating with the face of said collar, said thrust bearing including a plurality of shoes and means for mounting said shoes including a U-shaped member rotatably movable around the shaft into operative position and on which said shoes are supported in radial alignment with the extremity of said radial bearing.

26. In a combined radial and thrust bearing, in combination with a shaft and a thrust collar thereon, a radial bearing cooperating with said shaft and including one or more axially flexible bearing members provided with ribs to render the same circumferentially rigid, means for mounting said radial bearing in cooperative relationship with said shaft and a thrust bearing cooperating with the face of said collar, said thrust bearing including a plurality of shoes, a U-shaped supporting member on which said shoes are mounted, and means for movably supporting said U-shaped member including a circumferential rib and groove on said means and member whereby said member may be rotated around said shaft into operative position.

27. In a combined radial and thrust bearing, in combination with a shaft and a thrust collar thereon, a radial bearing cooperating with said shaft and including one or more axially flexible bearing members provided with ribs to render the same circumferentially rigid, means for mounting said radial bearing in cooperative relationship with said shaft, and a thrust bearing cooperating with the face of said collar, said thrust bearing including a plurality of shoes, a U-shaped supporting member on which said shoes are mounted, and means mounting said U-shaped member whereby it may be rotated around said shaft into operative position, said U-shaped member being provided with recesses to receive said shoes and said shoes being movable into and out of said recesses radially of the shaft when said U-shaped member is rotated out of its operative position.

28. In a combined radial and thrust bearing, in combination with a shaft and a thrust collar thereon, a radial bearing cooperating with said shaft and including one or more axially flexible radial bearing members provided with ribs to render the same circumferentially rigid, means for supporting said radial bearing in cooperative relationship with said shaft, passages in said supporting means through which oil may be conveyed to said radial bearing, and means for removing oil from the periphery of said collar and forcing the same under pressure through said passages.

29. In a combined radial and thrust bearing, in combination with a shaft and a thrust collar thereon, a radial bearing cooperating with said shaft and including one or more axially flexible radial bearing members provided with ribs to render the same circumferentially rigid, means for supporting said radial bearing in cooperative relationship with said shaft, mounting means for said last named means whereby said radial bearing may tilt as a whole with the shaft, passages in said supporting means through which oil may be conveyed to said radial bearing and including a groove in said mounting means around said supporting means, and means for forcing oil under pressure through said groove and passages to said radial bearing including means cooperating with the periphery of said collar for removing oil therefrom.

30. In a radial bearing, in combination with a shaft, radial bearing means therefor including a plurality of axially flexible shoes provided with radially projecting ribs to render the same circumferentially rigid, and means for mounting said shoes to tilt circumferentially of the shaft.

31. In a radial bearing, in combination with a shaft, radial bearing means therefor including a plurality of axially flexible shoes provided with radially projecting ribs to render the same circumferentially rigid, and means for mounting said shoes to tilt circumferentially of the shaft, said last named means including an annular member engaging each of said shoes in planes spaced axially of said shaft.

32. In a radial bearing, in combination with a shaft, radial bearing means therefor including a plurality of axially flexible shoes provided with radially projecting ribs to render the same circumferentially rigid, means for mounting said shoes to tilt circumferentially of the shaft, said last named means including an annular member engaging each of said shoes in planes spaced axially of said shaft, and means cooperating with said member to provide a support on which said member and said shoes may tilt with the shaft as a unit.

33. In a radial bearing, in combination with a shaft, radial bearing means therefor including one or more axially flexible radial bearing members provided with ribs to render the same circumferentially rigid, one or more of the ribs on each member being unrestrained at their peripheries so that each member may flex with the shaft, an annular member on which said radial bearing member or members are supported, and means mounted on said annular member and projecting into sealing contact with said shaft at opposite extremities of said bearing to provide an oil-tight enclosure therefor.

34. In a radial bearing, in combination with a shaft, radial bearing means therefor including one or more axially flexible radial bearing members provided with ribs to render the same circumferentially rigid, one or more of the ribs on each member being unrestrained at their peripheries so that each member may flex with the shaft, an annular member for mounting said bearing member or members, means supporting said annular member to tilt with the shaft, and means carried by said annular member and projecting in opposite directions into sealing contact with said shaft at the opposite extremities of said bearing to provide an oil-tight enclosure therefor.

35. In a radial bearing, in combination with a shaft, radial bearing means therefor including an axially flexible bearing shell provided with radially extending ribs to render the same circumferentially rigid, and a deeply corrugated flexible member following the contour of said bearing shell but spaced therefrom to provide a passage through which a cooling fluid may be circulated in heat interchanging relationship with said shell.

36. In a radial bearing, in combination with a shaft, radial bearing means therefor including an axially flexible bearing shell provided with radially extending ribs to render the same circumferentially rigid, means for mounting said shell whereby it may tilt as a unit axially of the shaft, and means for cooling said shell including a deeply corrugated flexible means spaced from but following in contour the axial outline of said shell to provide a zigzag passage through which a cooling fluid may flow in direct heat interchanging relationship with the periphery of said shell, said flexible means being secured to and movable with said shell but not interfering with the flexure thereof.

37. In a radial bearing, in combination with a shaft, radial bearing means therefor including an axially flexible radial bearing shell provided with radially extending ribs to render the same circumferentially rigid, and means cooperating with the periphery of a pair of axially spaced ribs and providing a support for said shell whereby said shell may tilt with the shaft.

38. In a radial bearing, in combination with a shaft, radial bearing means therefor including an axially flexible radial bearing shell provided with radially extending ribs to render the same circumferentially rigid, the peripheral surfaces of a pair of axially spaced ribs having axially curved surfaces lying in a common spherical surface, and means provided with a spherical surface cooperating with the periphery of said ribs and providing a mounting for said shell whereby said shell may tilt with the shaft.

39. In a radial bearing, in combination with a shaft, radial bearing means therefor including an axially flexible radial bearing shell provided with radially extending ribs to render the same circumferentially rigid, the peripheral surfaces of a pair of axially spaced ribs having axially curved surfaces lying in a common spherical surface, means provided with a spherical surface cooperating with the periphery of said ribs and providing a mounting for said shell whereby said shell may tilt with the shaft, and means between said ribs to prevent distortion thereof out of their radial planes.

40. In a radial bearing, in combination with a shaft, radial bearing means therefor including an axially flexible bearing shell provided with radially extending ribs to render the same circumferentially rigid, a channel-shaped supporting member engaging said shell in a pair of grooves formed by said ribs, and means for supporting said last named member.

41. In a radial bearing, in combination with a shaft, radial bearing means therefor including an axially flexible shell provided with radially extending ribs to render the same circumferentially rigid, a channel-shaped supporting member engaging said shell in a pair of axially spaced grooves formed by said ribs, and means mounting said member to tilt with the shaft.

42. In a radial bearing, in combination with a shaft, relatively stationary radial bearing means therefor including one or more radial bearing members having axial flexibility and circumferential rigidity throughout the length thereof whereby distortion of each member circumferentially of the shaft is prevented, and means for mounting said radial bearing means in operative relationship to said shaft along a pair of axially spaced circumferential lines which are also spaced axially from the ends of the bearing member.

43. In a radial bearing, in combination with a shaft, relatively stationary radial bearing means therefor including one or more radial bearing members having radially extending ribs to render the same circumferentially rigid, each member being relatively thin between said ribs to render the same axially flexible, and means for mounting said radial bearing means in operative relationship to said shaft without restraining one or more of the ribs thereof so that the same may flex and move its ribs with respect to the mounting means.

44. In a radial bearing, in combination with a shaft, relatively stationary radial bearing means therefor including one or more radial bearing members which are axially flexible and provided with ribs to render the same circumferentially rigid, one or more of the ribs of each member being unrestrained at their periphery so that each member may flex with the shaft, and means for mounting said radial bearing means in operative relationship to said shaft.

45. In a radial bearing, in combination with a shaft, relatively stationary radial bearing means therefor including one or more radial bearing members which are axially flexible and provided with ribs to render the same circumferentially rigid, one or more of the ribs of each member being unrestrained at their periphery so that each member may flex with the shaft, and means for mounting said radial bearing means in operative relationship to said shaft, said last named means being mounted to tilt when said shaft flexes.

46. In a radial bearing, in combination with a shaft, relatively stationary radial bearing means therefor including a flexible bearing shell provided with radially projecting ribs to render the same circumferentially rigid, one or more of said ribs at each end of said shell being peripherally unrestrained to move with said shell when the shell flexes with the shaft, and means for mounting said shell so that it may flex with respect to said mounting means.

47. In a radial bearing, in combination with a shaft, relatively stationary radial bearing means therefor including a flexible bearing shell provided with radially projecting ribs to render the same circumferentially rigid, one or more of said ribs at each end of said shell being peripherally unrestrained to move with said shell when the shell flexes with the shaft, and means for mounting said shell so that it may flex with respect to said mounting means, said last named means being tiltably mounted to tilt with the shaft.

48. In a radial bearing, in combination with a shaft, relatively stationary radial bearing means therefor including a flexible bearing shell provided with radially projecting ribs to render the same circumferentially rigid, one or more of said ribs at each end of said shell being peripherally unrestrained to move with said shell when the shell flexes with the shaft, and means for mounting said shell so that it may flex with respect to said mounting means, said last named means cooperating with ribs spaced axially from each end of said shell.

49. In a radial bearing, in combination with a shaft, relatively stationary radial bearing means therefor including a flexible bearing shell provided with radially projecting ribs to render the same circumferentially rigid, one or more of said ribs at each end of said shell being peripherally unrestrained to move with said shell when the shell flexes with the shaft, and means for mounting said shell so that it may flex with respect to said mounting means, said last named means bridging an intermediate rib on said shell and leaving the same peripherally unrestrained.

50. In a radial bearing, in combination with a shaft, relatively stationary radial bearing means therefor including a flexible bearing shell provided with radially projecting ribs to render the same circumferentially rigid, one or more of said ribs at each end of said shell being peripherally unrestrained to move with said shell when the shell flexes with the shaft, and means for mounting said shell so that it may flex with respect to said mounting means, said last named means cooperating with said shell in grooves between axially spaced ribs.

51. In a radial bearing, in combination with a shaft, relatively stationary radial bearing means therefor including a flexible bearing shell provided with radially projecting ribs to render the same circumferentially rigid, one or more of said ribs at each end of said shell being peripherally unrestrained to move with said shell when the shell flexes with the shaft, and means for mounting said shell so that it may flex with respect to said mounting means, said last named means cooperating with axially spaced ribs on said shell intermediate the center and the ends thereof.

52. In a radial bearing, in combination with a shaft, radial bearing means therefor including a plurality of tiltably mounted shoes, an annular member on which said shoes are mounted to move axially with said shaft, and means mounted on said annular member and projecting axially therefrom at each side thereof and into sealing contact with said shaft at opposite extremities of said bearing to provide an oil-tight enclosure therefor.

53. In a radial bearing, in combination with a shaft, radial bearing means therefor including a plurality of tiltably mounted shoes, an annular member on which said shoes are mounted and with respect to which said shoes may move axially as the shaft deflects, and means mounted on said annular member and providing an oil-tight enclosure for said shoes without interfering with the movement thereof as the shaft deflects, said means including housing elements for said shoes projecting from opposite sides of said annular member, said housing elements projecting inwardly into embracing relationship with the shaft at opposite extremities of said shoes and having oil retaining means cooperating with said shaft to prevent escape of oil along said shaft.

HARRY A. S. HOWARTH.